United States Patent [19]

Tolliver

[11] 4,174,076

[45] Nov. 13, 1979

[54] CUTTING STRETCHED INTERLAYER SHEETING

[75] Inventor: Richard J. Tolliver, Greensburg, Pa.

[73] Assignee: PPG Industries, Inc., Pittsburgh, Pa.

[21] Appl. No.: 814,068

[22] Filed: Jul. 8, 1977

[51] Int. Cl.$^2$ .......................... B29C 17/14; B26D 3/28
[52] U.S. Cl. ................................. 242/56 B; 242/110.1; 264/159; 264/160; 264/292
[58] Field of Search .............. 264/291, 292, 159, 160, 264/DIG. 73; 425/403, DIG. 53; 242/56 B, 72 R, 72.1, 110, 110.3, 110.1

[56] References Cited

U.S. PATENT DOCUMENTS

| | | | |
|---|---|---|---|
| 2,700,007 | 1/1955 | Dennison et al. ..................... | 264/291 |
| 2,817,117 | 12/1957 | Shields et al. ........................ | 264/291 |
| 2,933,759 | 4/1960 | Startzell ....................... | 425/DIG. 53 |
| 2,937,407 | 5/1960 | Richardson .......................... | 264/160 |
| 3,467,332 | 9/1969 | Bachman ................................. | 242/56 |
| 3,696,182 | 10/1972 | Stark et al. ........................... | 264/291 |

*Primary Examiner*—James B. Lowe
*Attorney, Agent, or Firm*—Edward I. Mates

[57] ABSTRACT

This invention involves cutting a series of individual sheets of thermoplastic interlayer material into a selected trapezoidal shape of adjustable length and shape by winding a continuous ribbon of said material on an adjustable mandrel and cutting the continuous ribbon while mounted on the mandrel properly adjusted. The adjustable mandrel of this invention comprises means for independently adjusting the diameter or circumference of its opposite axial end portions so as to ensure that the plies of said material wound onto said mandrel are cut into trapezoidal shapes of the proper length and outline shape by one or more simple cuts parallel to the axis on which the mandrel is mounted for rotation.

6 Claims, 9 Drawing Figures

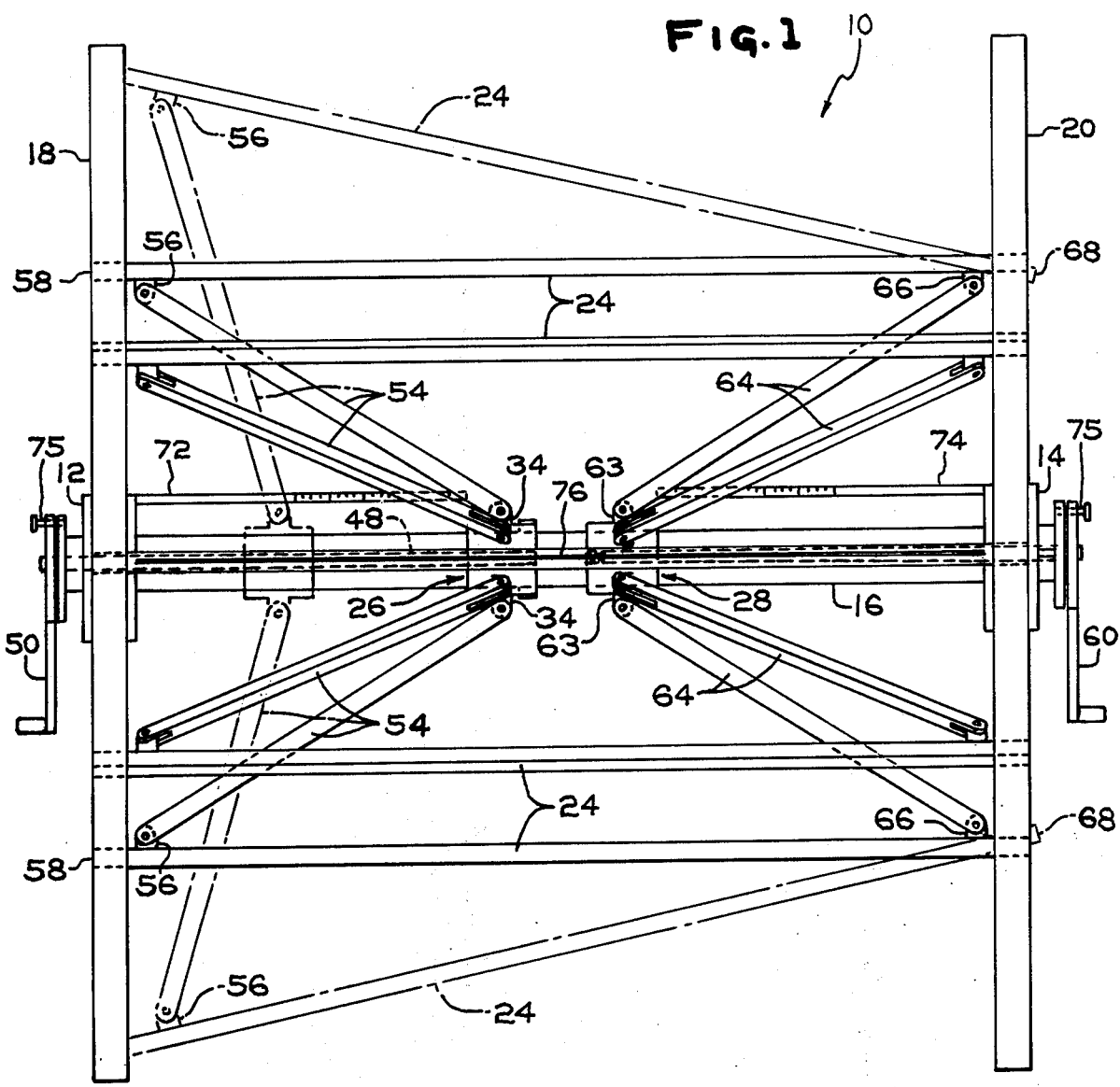
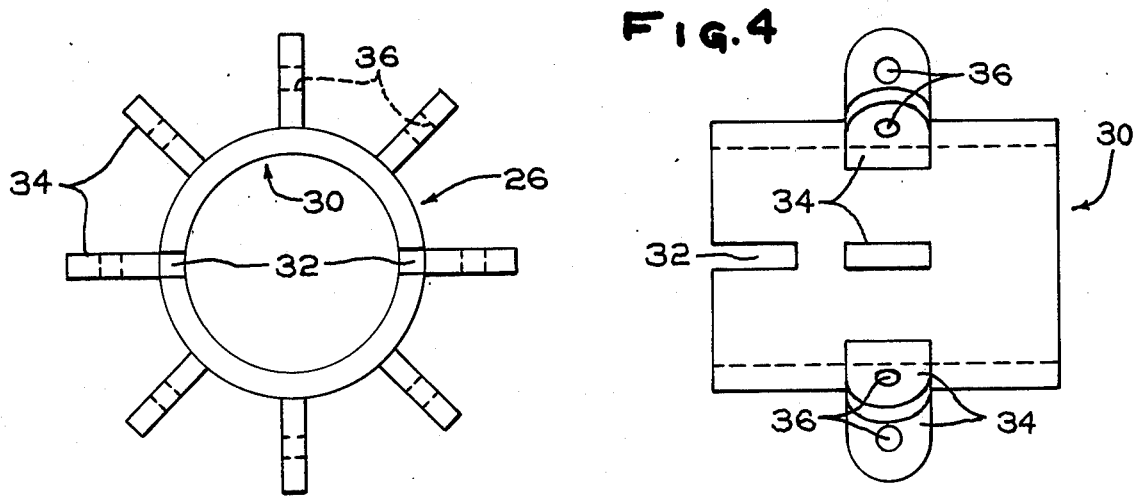

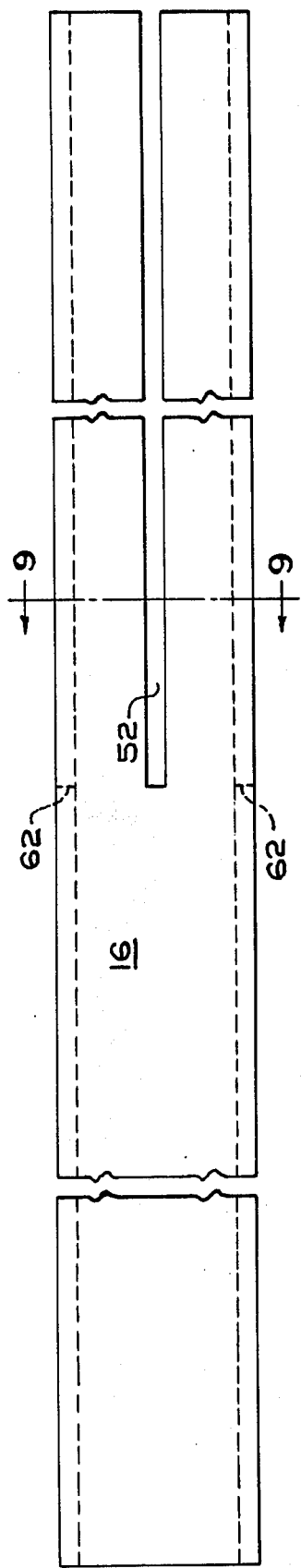
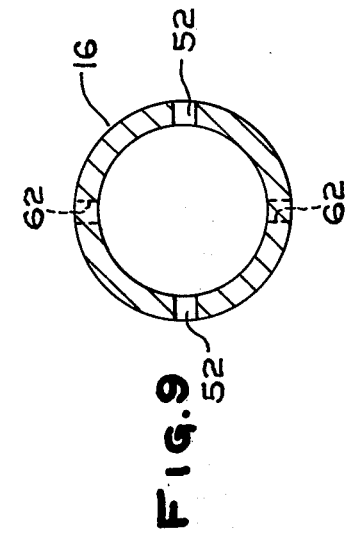
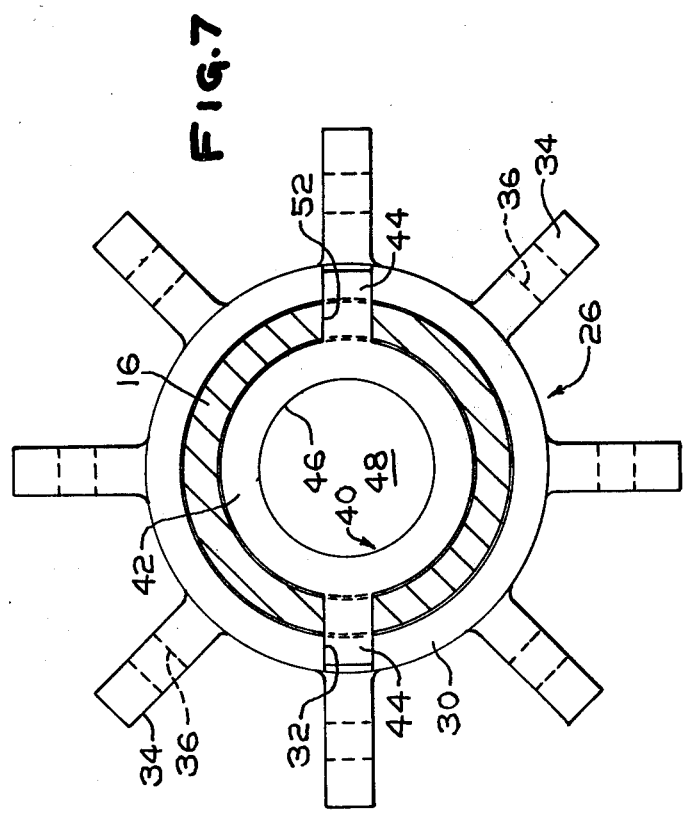

CUTTING STRETCHED INTERLAYER SHEETING

BACKGROUND OF THE INVENTION

1. Field of the Invention

The present invention relates to a method and apparatus for cutting continuous ribbons of flexible plastic material suitable for use as interlayer material in laminated automobile windshields into a series of discrete sheets, each having a preselected trapezoidal shape. The present invention has particular use in the fabrication of interlayers having a band of dye disposed along one longitudinal edge margin of the interlayer destined to be located along the upper edge of the laminated windshield when the latter is installed in an automobile.

Recent designs of automobile windshields require the lamination of bent glass sheets that are substantially trapezoidal in outline. The plastic interlayers for such sheets are usually supplied in the form of a continuous ribbon mounted on a roll. In the past, such ribbons have been cut into rectangular shapes by rotating the ribbon about a reel to form several layers or plies and cutting the layers transversely to form a series of rectangular sheets whose length approximated the outer perimeter of the reel. A considerable amount of plastic has been lost through trimming two triangular-shaped portions from the opposite ends of the rectangular sheets to convert from rectangular to trapezoidal shapes. Furthermore, the majority of automobile windshields are provided with a dyed upper portion. The purpose of this tinted or dyed portion is to serve as a means for avoiding glare and to reduce the intensity of overhead radiation entering into the vehicle and annoying the driver and his passengers.

It is usually desirable that the colored strip portion extend along the top portion of the windshield. The lower edge of the colored or tinted strip should extend generally horizontally when the windshield is installed across the front of the automobile in an inclined position. Since the windshields of modern cars have a continuous curve from one side to the other side, it is necessary to stretch the interlayer in such a manner that the edge portion that is colored, tinted or dyed is stretched to a lesser extent than the undyed portion forming the lower portion of the windshield when the latter is installed.

In the past, dyed plastic has been stretched differentially either on adjustable shaping frames or shaping cones. The shaping frames stretch one sheet at a time. The sheet must be mounted on the frame before stretching and removed after stretching, a time-consuming operation. Shaping cones permit the winding of several layers, which are stretched simultaneously, or the continuous movement of a continuous ribbon thereacross. Both of these latter techniques are faster than the adjustable frame technique for stretching plastic differentially, but do not make it possible to cut individual interlayer sheets of the proper size (particularly length) and proper trapezoidal shape for more than a single production pattern while the continuous ribbon is wound on the stretching cone in its differentially stretched condition.

2. Description of the Prior Art

U.S. Pat. No. 2,933,759 to Startzell discloses a plastic stretching apparatus that resembles an umbrella for stretching partially dyed plastic differentially. The ribs of the umbrella extend peripherally around a center shaft so that the ribs of the umbrella are capable of moving in unison from a generally cylindrical shape to a conical shape. The Startzell patent discloses more than one embodiment. In one of these embodiments, links of different lengths are provided on the opposite axial ends of the umbrella-like structure to expand the opposite axial ends radially or circumferentially in different planes transverse to the center shaft simultaneously and at different rates. Thus, the Startzell stretching apparatus is capable of stretching sheets differentially depending upon the relative lengths of the links that pivotally connect sleeves mounted on the center shaft to each end of the ribs of the umbrella. The Startzell stretching umbrella is thus able to convert a continuous ribbon of partly dyed or tinted plastic from a ribbon having a rectangular shape into a ribbon having a curved border between the dyed and undyed portions of the plastic ribbon. The structure of the stretching umbrella has to be rebuilt or a different umbrella has to be provided for each different pattern of windshields to be produced.

U.S. Pat. No. 3,467,332 to Bachman discloses a mandrel suitable for cutting an elongated ribbon of clear plastic into trapezoidal lengths that interfit with one another so that each two lengths of plastic that are cut from each circumferential ply of the plastic sheeting interfits. Clear plastic sheeting does not have to be distorted in the manner needed for plastic having a dyed portion. While the plastic cutting apparatus of the Bachman patent discloses means for adjusting the length of the periphery of the plastic layers or plies and provides means for orienting a pair of guides for cutting devices mounted on the cutting reel, this apparatus is incapable of use with partially dyed plastic except in the wasteful manner provided by prior art apparatus which required the plastic to be cut to rectangular shapes and then the triangles removed from the opposite longitudinal ends in order to provide the trapezoidal shapes desired.

U.S. Pat. No. 3,696,186 to Stark et al discloses an adjustable stretching cone having an adjustment mechanism operated by a crank in a standard manner to change the diameter of the cone along its narrow end. A plastic ribbon wound about the cone is differentially stretched an amount that depends upon the relative circumference of the smaller end of the cone compared to its larger fixed end. After the continuous ribbon is differentially stretched, it is cooled and cut to finite lengths. Each finite length has its lateral edges stretched to curved configurations of different arc lengths. According to this apparatus, each length is cut individually from the continuous ribbon. The cutting operation may thus limit the rate at which the individual sheets or lengths of plastic are fabricated from the continuous ribbon. On the other hand, the distorting or differential stretching of the continuous ribbon is performed while the conical stretching frame is rotated and this provides a limited time to differentially stretch the plastic and permit the plastic to be cooled throughout its thickness to a temperature at which it becomes permanently set in its deformed shape resulting from the differential stretching of its opposite side edges.

Thus, prior to the present invention, the glass laminating art lacked a method and apparatus that made it possible to cut a plurality of individual sheets of different sizes and trapezoidal shapes as needed from a single continuous ribbon of partially dyed plastic.

SUMMARY OF THE INVENTION

The present invention relates to a method and apparatus for winding a continuous ribbon of plastic interlayer material onto a mandrel to form a plurality of plies and cutting each ply into one or more individual sheets of a predetermined size and trapezoidal shape from the continuous ribbon of material. Means is provided for adjusting the circumference at each end of the mandrel so as to ensure flexibility of the mandrel for supporting plastic sheeting to be cut into different sizes and different trapezoidal shapes. Thus, mandrel is adjustable independently at each end thereof so that the circumference of the mandrel supporting the multiple plies of sheeting along its longer edge or undyed portion is substantially equal to an integral number of lengths of the longer side edge of the predetermined trapezoidal shape and the shorter end of the mandrel has an adjusted circumference supporting the shorter edge of the plastic sheeting that is an integral number of lengths of the shorter side edge of the predetermined trapezoidal shape to be cut. Thus, the present invention provides a single apparatus that is capable of both adjusting to the shape desired for the individual trapezoidal sheets to be cut from the continuous ribbon and also to the size of the sheets.

The trapezoidal shape of each piece taken from the continuous ribbon is obtained by cutting along a line parallel to the central shaft on which the adjustable mandrel is rotated. When the lengths of the opposite circumferences of the adjustable mandrel correspond to the lengths of the longer and shorter edges of a single length of the trapezoidal piece to be cut, only one cut parallel to the axis of the central shaft is necessary. When the opposite circumferences of the mandrel are lengthened to correspond to a plurality of lengths to be cut, two or more cuts are provided. All of these cuts are made in a direction parallel to the axis of the central shaft of the mandrel. The cut sheets develop a trapezoidal shape because of the conical shape of the outer arms of the doubly adjustable mandrel.

The present invention will be understood better in the light of a description of a specific embodiment which follows.

BRIEF DESCRIPTION OF THE DRAWINGS

In the drawings that form part of the description of a specific embodiment of the present invention and where like reference numbers refer to like structural elements, FIG. 1 is a transverse view of an illustrative embodiment built according to the present invention;

FIG. 3 is an end elevational view of a typical adjustment housing forming part of the illustrative embodiment of this invention;

FIG. 4 is a view taken at a right angle to the view of FIG. 3 of said adjustment housing;

FIG. 7 is a cross-sectional view of the center pipe of said embodiment of this invention, showing its relation to said adjustment housing and said mandrel adjusting nut;

FIG. 8 is a longitudinal, fragmentary view of said center pipe; and

FIG. 9 is a cross-sectional view taken along the lines 9—9 of FIG. 8 showing additional details in phantom.

DESCRIPTION OF THE PREFERRED EMBODIMENTS

Figure 2:
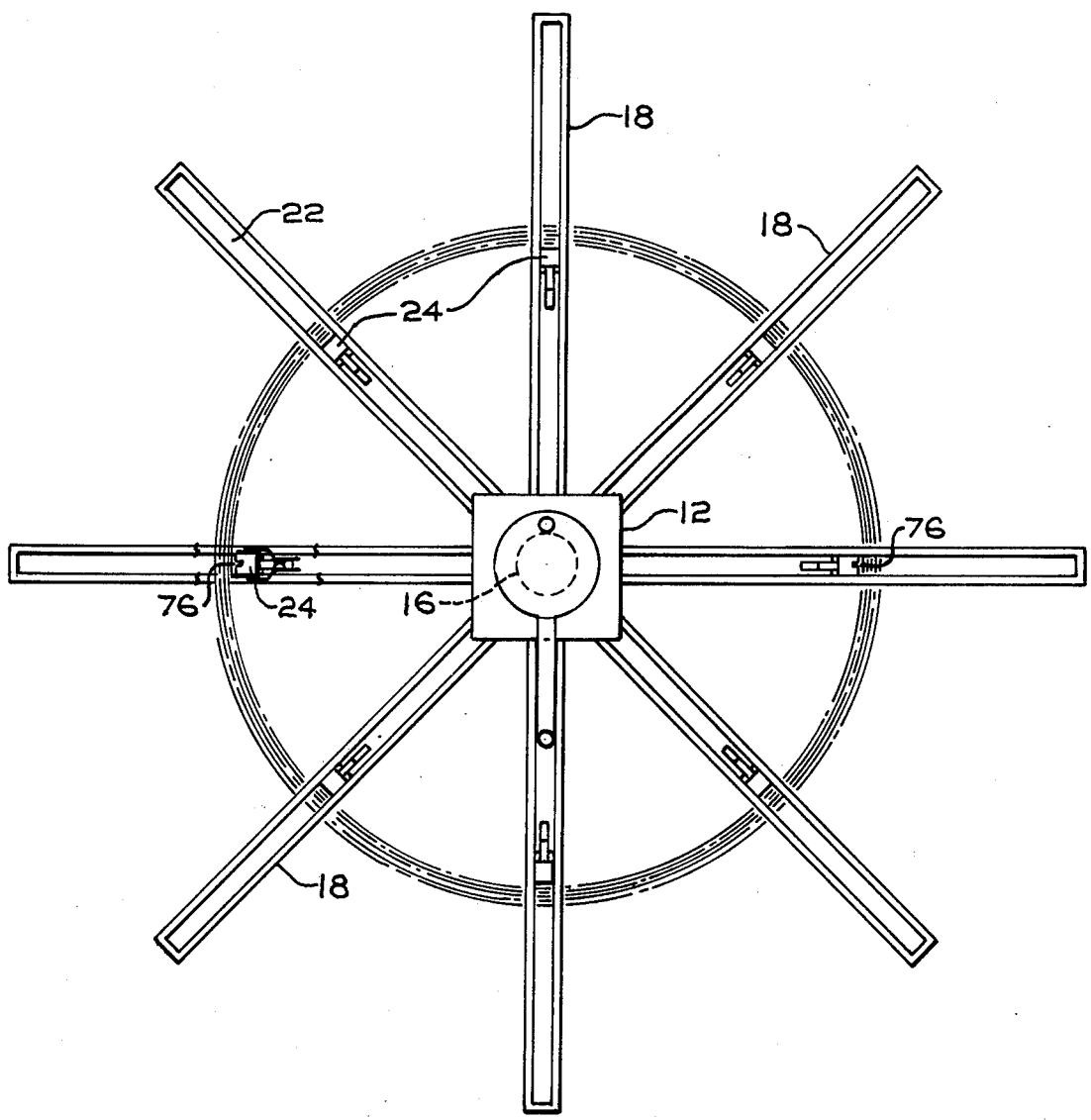
FIG. 2 is an end view of one of the ends of the mandrel depicted in FIG. 1.

Referring to the drawings, the apparatus of the present invention comprises a mandrel 10 having a first end member 12 and a second end member 14. A central pipe 16 interconnects the end members 12 and 14. A plurality of radially extending arms 18 is attached in equi-angular relation about end member 12. An equal number of radially extending arms 20 is attached in equi-angular relation about end member 14. The radial arms 18 attached to the first end member 12 are aligned with the corresponding radially arms 20 attached to the second end member 14. Each of the radial arms 18 and 20 is provided with a radially extending groove 22. (See FIG. 2) A peripheral arm 24 interconnects each radially extending arm 18 and its corresponding radially extending arm 20. The illustrative embodiment shows 8 radial arms 18, 8 radial arms 20 and 8 peripheral arms 24. It is understood that the number illustrated in exemplary and may be increased or decreased as desired without departing from the gist of this invention. Each peripheral arm has one end portion engaging the groove 22 of one of the radially extending arms 18 and an another end portion engaging the groove 22 in the corresponding radially extending arm 20.

A first adjustment housing 26 is mounted in sliding relation to a central pipe 16 to the side of the longitudinal center of the pipe 16 extending toward the first end member 12. A second adjustment housing 28 is mounted in sliding relation to the central pipe 16 to the side of the longitudinal center of the pipe 16 extending toward the second end member 14.

The adjustment housing 26 as seen in FIGS. 3 and 4 comprises a slotted cylindrical member 30 having a pair of diametrically opposed, axially extending slots 32 and eight tabs 34 extending radially outward at 45 degree intervals from the outer surface of the cylindrical member 30. Each of the tabs 34 has an aperture 36 at its outer portion. The cylindrical member 30 has an inner circumferential wall sufficient in diameter to clear the outer circumferential wall of the central pipe 16.

Figure 5:
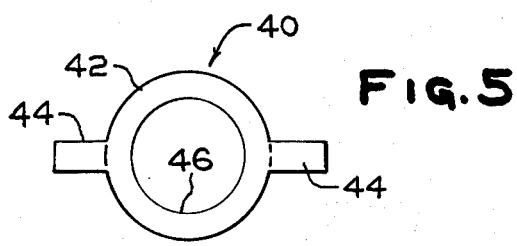
FIG. 5 is an end view of a mandrel adjusting nut that comprises an element of said illustrative embodiment.
Figure 6:
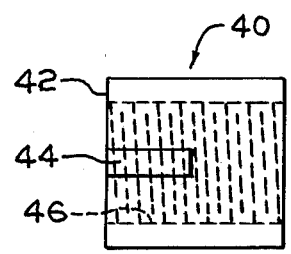
FIG. 6 is a view taken at a right angle to the view of FIG. 5.

A first mandrel adjusting nut 40 (see FIGS. 5 and 6) is received within the central pipe 16 as depicted in the cross-sectional view of FIG. 7. The nut 40 comprises an inner cylindrical housing 42 having an outer wall of sufficient dimension to slide within the inner wall of the central pipe 16 and a pair of diametrically opposed, radially extending lugs 44. The inner wall 46 of the inner cylindrical housing 42 is threaded to mate with a threaded rod 48 that extends within the central pipe 16 to a threaded connection with the threaded inner wall 46 of the inner cylindrical housing. The threaded rod 48 is connected at its outer end to a first crank means 50.

The first crank means 50 is located adjacent the first end member 12 of the mandrel 10. In order to insure that the first adjustment housing 26 moves axially when the first crank means is actuated, the central pipe 16 has a pair of diametrically opposed, elongated slots 52 that are aligned with the slots 32 so that the radially extending lugs 44 extend through the aligned slots and provide means to cause the first adjustment housing 26 to move axially relative to central pipe 16 in response to movement of the first mandrel adjusting nut 40.

A link member 54 pivotally connects each of the apertured tabs 34 to a corresponding apertured tab 56 attached to an end portion 58 of a corresponding peripheral arm 24 adjacent the radially extending arms 18. This construction and arrangement allows the end portions 58 to move from the solid line positions depicted in FIG. 1 to the positions depicted in phantom in response to the axial movement of said first adjustment housing 26.

A second crank means 60 is operatively connected to the second adjustment housing 28 in a manner similar to the operative connection between the first crank means 50 and the first adjustment housing 26. For ease of fabrication, the right hand portion of the central pipe 16 is provided with diametrically opposed, elongated slots 62 that are 90 degrees out of alignment and spaced longitudinally of slots 52. The second adjustment housing 28 is provided with tabs 63 attached thereto and arranged in a manner similar to the arrangement of the tabs 34 relative to the first adjustment housing 26. A series of link members 64 pivotally interconnect each of the tabs 63 to a corresponding apertured tab 66 attached to the end portion 68 of the corresponding peripheral arm 24 adjacent radially extending arms 20.

It is now obvious that the first crank means 50 can be operated to adjust the circumference of the mandrel 10 at its axial end portion adjacent the radially extending arms 18 independently of the operation of the second crank means 60 to adjust the circumference of the mandrel 10 at its axial end portion adjacent the radially extending arms 20. Therefore, it is possible with the apparatus of the illustrative embodiment to adjust the circumferential length of either axial end of the mandrel independently of the adjusted circumferential length of said mandrel at its other axial end.

Indexing means 72 and 74 extend inward from end members 12 and 14 to guide operators to set the positions of the adjustment housings 26 and 28 into positions required for any given pattern. Locking means 75 are provided for each of the crank means 50 and 60 to hold the adjustment housings 26 and 28 in their proper locations selected for the pattern to be produced. When locked, either crank means may be used to wind a continuous ribbon onto the mandrel.

When a continuous ribbon of plastic interlayer material (such as polyurethane or plasticized polyvinyl butyral) having a dyed portion along one longitudinal edge is wound on the mandrel, the opposite axial end portions are adjusted in circumference to correspond with the length desired for an integral number of sheets to be cut from said continuous ribbon. This adjustment may be made in advance if the continuous ribbon has been previously stretched to approximately the differentially stretched condition desired on an adjustable umbrella-type stretching cone described and claimed in U.S. Pat. No. 2,933,759 to Startzell, which can be adjusted to provide a desired shape for the boundary between the dyed and undyed portions of the ribbon, but is extremely difficult to obtain a proper circumference corresponding to the length required along the opposite longitudinal edges of the cut pieces of interlayer material.

In cases where the continuous ribbon is wound around the mandrel of the present invention in an unstretched condition, the opposite end portions of the mandrel are independently adjusted in circumference after the continuous ribbon of plastic interlayer material is wound on the mandrel and the plastic interlayer material is at an elevated temperature at which it is readily stretchable. An acceptable temperature range for stretching is 150° F. (65.6° C.) to 190° F. (87.8° C.) with a range of 160° F. (71.1° C.) to 170° F. (76.7° C.) preferred. The differentially expanded mandrel with about 30 layers or plies of plastic wound thereon is then kept in its differentially expanded condition for about one hour while cooled to room temperature. This is sufficient time for the plastic to set in its differentially stretched state.

Once the plastic is set in its distorted state, it is ready for cutting. An elongated slot 76 is provided in the outward facing surface of one or more selected peripheral arms 24 to serve as a guide member for a cutting knife. A cutting knife is passed along the elongated slot 76 to cut each of the plies. One elongated guide member is used when the mandrel is adjusted to opposite circumferential lengths corresponding to the lengths desired for the dyed edge and undyed edge of each sheet to be cut from the plies of continuous ribbon.

In order to increase the capacity of the mandrel to cut discrete sheets of trapezoidal shape from the continuous ribbon, the opposite ends of the mandrel may be adjusted to have their circumferences correspond to an integral number of lengths of interlayer sheeting of desired size and of trapezoidal shape. Under such circumstances, if two discrete sheets of trapezoidal shape are to be cut from each ply of continuous ribbon, a pair of peripheral arms 24 in diametrically opposed relation to one another are provided with slots 76 for the cutting edge. For cutting three sheets from each ply, the peripheral arms 24 provided with elongated slots 76 are located around the mandrel in equi-angular relation 120 degrees apart about its periphery. This latter arrangement would involve a minimum of six peripheral arms or a multiple of three in excess of six.

After the sheets are cut from the mandrel, they are stored in horizontal stacks at a controlled temperature (about 70° F. or 21.1° C.) and controlled relative humidity (about 20 percent) until such time as the plastic interlayer material is needed. The stored sheets are then assembled and laminated to glass sheets in the usual manner.

The mandrel 10 may also be used as a stretching means. In order to do so, the mandrel is adjusted so that the circumferences at its opposite ends are equal to one another and correspond to an integral number of shorter edge lengths desired for the ultimate trapezoidal shapes. A continuous ribbon of plastic interlayer material is wound on the mandrel by first clamping an end of the ribbon onto a peripheral arm 24 (preferably one provided with a longitudinal slot 76), preferably while the ribbon is at an elevated temperature suitable for stretching. The end portion of the mandrel supporting the undyed portion is adjusted to increase its circumference to correspond to said integral number of longer edge lengths desired for the ultimate trapezoidal shapes, thereby distorting the plastic plies from cylindrical to conical shapes. The plastic windings are cooled to room temperature and kept at said cold temperature until the plastic sets in its distorted shape. The wound plastic is then ready for cutting.

In case the plastic interlayer material is wound on the mandrel while at a temperature below one at which it distorts readily, it becomes necessary to heat the plastic after it is wound on the mandrel before enlarging the circumference of the end of the mandrel that supports the undyed portion. After heating and stretching, the distorted plastic interlayer material is cooled to set its distorted shape until the plastic interlayer material is ready for cutting.

The mandrel 10 of the present invention has both of its ends adjustable so that its ultimately shorter end can be adjusted to conform to the shorter length of the trapezoidal shape desired while its ultimately longer end can be adjusted independently of the adjustment at the smaller end to provide a circumferential length that corresponds to the longer length of said trapezoidal shape and also simultaneously controls the obliquity of the transverse edges of said trapezoidal shapes compared to their shorter and longer lengths of the longitudinal end edges.

The present invention provides less waste of dyed plastic material because of the ability of the apparatus conforming to the present invention to control both the shape and the size of each ply of plastic interlayer material that is wound on the mandrel. Prior art plastic stretching apparatus did not have the ability to make each ply conform both in size and shape to an integral number of sheets of various patterns cut from a continuous winding of multiple plies of ribbon.

The form of the invention shown and described herein represents a preferred illustrative embodiment thereof. It is understood that various changes may be made without departing from the gist of the present invention as defined in the claimed subject matter that follows.

I claim:

1. A method of cutting a series of individual sheets of thermoplastic interlayer material having a first side edge of a predetermined trapezoidal sheet and a second opposed side edge of said trapezoidal sheet, one of which side edges is longer than the other, from a continuous ribbon of said material having a dyed border portion along one of said side edges and that has been differentially stretched previously to approximately the differentially stretched condition desired, comprising:
   (a) independently adjusting the circumferences at both ends of an adjustable mandrel to provide a conical shape approximately equal to an integral number of a given longitudinal length of said predetermined shape along one side portion of said mandrel and the same number of a different longitudinal length of said predetermined shape along the other side portion of said mandrel,
   (b) winding a plurality of plies of said material onto said mandrel so adjusted in circumference at both ends to provide a conical shape having a circumference at one end that corresponds to an integral number of a given length along one side of said thermoplastic interlayer material and a circumference at its other end that corresponds to the same number of a different length along the other side of said thermoplastic interlayer material and rotatable about an axis of rotation,
   (c) cutting said plies along an integral number of lines equal to said integral number at equi-angular relation therebetween, said lines extending in planes that intersect said axis, and
   (d) removing the plies from said mandrel to provide a plurality of sheets of said predetermined trapezoidal shape having longitudinal side edges approximately equal to said predetermined different lengths, each of which has a dyed portion along said one side edge of said given length and said opposite side edge of said different length.

2. The method as in claim 1, wherein each of said plies is cut from side to side along a single line in a plane that intersects said axis of said mandrel to form a single piece of said thermoplastic interlayer material of trapezoidal shape and of the desired size from each of said plies.

3. The method as in claim 1, wherein each of said plies is cut from side to side along two diametrically opposed lines in a plane that intersects said axis of said mandrel to form two pieces of said thermoplastic interlayer material of trapezoidal shape and of the desired size from each of said plies.

4. The method as in claim 1, wherein said continuous ribbon of thermoplastic interlayer material has a dyed border portion along a shorter longitudinal edge portion thereof, further comprising applying the opposite longitudinal edge portion of the plies to the end of said mandrel having a longer circumference and applying said dyed border portion to the end of said mandrel having a shorter circumference.

5. The method as in claim 4, wherein each of said plies is cut from side to side along a single line in a plane that intersects said axis of said mandrel to form a single piece of said thermoplastic interlayer material of trapezoidal shape and of the desired size from each of said plies.

6. The method as in claim 4, wherein each of said plies is cut from side to side along two diametrically opposed lines in a plane that intersects said axis of said mandrel to form two pieces of said thermoplastic interlayer material of trapezoidal shape and of the desired size from each of said plies.

* * * * *

UNITED STATES PATENT AND TRADEMARK OFFICE
CERTIFICATE OF CORRECTION

PATENT NO. : 4,174,076

DATED : November 13, 1979

INVENTOR(S) : Richard J. Tolliver

It is certified that error appears in the above-identified patent and that said Letters Patent are hereby corrected as shown below:

Column 3, line 12, "mandrel" should be --the mandrel--.

Column 4, line 22, "in" should be --is--.

Column 6, line 29, "edge" should be --step--.

Signed and Sealed this

Twenty-fourth Day of June 1980

[SEAL]

Attest:

SIDNEY A. DIAMOND

Attesting Officer

Commissioner of Patents and Trademarks